(12) United States Patent
Dubey et al.

(10) Patent No.: US 12,423,837 B2
(45) Date of Patent: *Sep. 23, 2025

(54) THREE DIMENSIONAL (3D) OBJECT DETECTION

(71) Applicant: TEXAS INSTRUMENTS INCORPORATED, Dallas, TX (US)

(72) Inventors: Aishwarya Dubey, Plano, TX (US); Hetul Sanghvi, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/755,829

(22) Filed: Jun. 27, 2024

(65) Prior Publication Data
US 2024/0346666 A1  Oct. 17, 2024

Related U.S. Application Data

(63) Continuation of application No. 17/875,559, filed on Jul. 28, 2022, now Pat. No. 12,051,213, which is a
(Continued)

(51) Int. Cl.
*G06K 9/00* (2022.01)
*G06T 3/40* (2006.01)
(Continued)

(52) U.S. Cl.
CPC .............. *G06T 7/269* (2017.01); *G06T 3/40* (2013.01); *G06V 10/25* (2022.01); *G06V 10/50* (2022.01);
(Continued)

(58) Field of Classification Search
CPC .......... G06K 9/00201; G06K 9/00718; G06K 9/3233; G06K 9/34; G06K 9/4642; G06T 7/269; G06T 3/40; G06T 2207/10021
See application file for complete search history.

(56) References Cited

U.S. PATENT DOCUMENTS

2006/0147087 A1*  7/2006  Goncalves ........... G06K 9/3233
                                                     382/103
2011/0311137 A1   12/2011  Liu
(Continued)

OTHER PUBLICATIONS

R. V. H. M. Colque, C. A. C. Júnior and W. R. Schwartz, "Histograms of Optical Flow Orientation and Magnitude to Detect Anomalous Events in Videos," 2015 28th SIBGRAPI Conference on Graphics, Patterns and Images, Salvador, 2015, pp. 126-133. (Year: 2015).*

(Continued)

*Primary Examiner* — Fayyaz Alam
(74) *Attorney, Agent, or Firm* — Xianghui Huang; Frank D. Cimino

(57) ABSTRACT

A method for identifying regions of interest (ROIs) includes receiving, by a processor from a video camera, a video image and computing, by the processor, an optical flow image, based on the video image. The method also includes computing, by the processor, a magnitude of optical flow image based on the video image and computing a histogram of optical flow magnitudes (HOFM) image for the video image based on the magnitude of optical flow image. Additionally, the method includes generating, by the processor, a mask indicating ROIs of the video image, based on the HOFM.

20 Claims, 13 Drawing Sheets

Related U.S. Application Data continuation of application No. 16/869,387, filed on May 7, 2020, now Pat. No. 11,403,859, which is a continuation of application No. 16/017,148, filed on Jun. 25, 2018, now Pat. No. 10,685,212.

(51) Int. Cl.
| | |
|---|---|
| *G06T 7/269* | (2017.01) |
| *G06V 10/25* | (2022.01) |
| *G06V 10/50* | (2022.01) |
| *G06V 20/40* | (2022.01) |
| *G06V 20/56* | (2022.01) |
| *G06V 20/64* | (2022.01) |

(52) U.S. Cl.
CPC .............. *G06V 20/41* (2022.01); *G06V 20/56* (2022.01); *G06V 20/64* (2022.01); *G06T 2207/10021* (2013.01)

(56) References Cited

U.S. PATENT DOCUMENTS

| | | | |
|---|---|---|---|
| 2012/0106800 A1* | 5/2012 | Khan | G06K 9/00651 382/104 |
| 2018/0082429 A1 | 3/2018 | Choudhury | |
| 2019/0147235 A1 | 5/2019 | Tang | |

OTHER PUBLICATIONS

N. Patil and P. K. Biswas, "Video Anomaly Detection and Localization using 3D SL-HOF Descriptor," 2017 Ninth International Conference on Advances in Pattern Recognition (ICAPR), Bangalore, 2017, pp. 1-6. (Year: 2017).*

N. Patil and P. K. Biswas, "Global abnormal events detection in surveillance video—A hierarchical approach," 2016 Sixth International Symposium on Embedded Computing and System Design (ISED), Patna, 2016, pp. 217-222. (Year: 2016).*

A. Das K.M. and O. V. R. Murthy, "Optical Flow Based Anomaly Detection in Traffic Scenes," 2017 IEEE International Conference on Computational Intelligence and Computing Research (ICCIC), Coimbatore, 2017, pp. 1-7. (Year: 2017).*

H. H. Alqaysi and S. Sasi, "Detection of Abnormal behavior in Dynamic Crowded Gatherings," 2013 IEEE Applied Imagery Pattern Recognition Workshop (AIPR), Washington, DC, 2013, pp. 1-6. (Year: 2013).*

Alqaysi, H., et al., "Detection of Abnormal Behavior in Dynamic Crowded Gatherings," 2013 IEEE Applied Image Recognition Workshop (AIPR), Washington, DC, 2013, 6 pages.

Colque, R., et al., "Histograms of Optical Flow Orientation and Magnitude to Detect Anomalous Events in Videos," 2015 28th SIBGRAPI Conference on Graphics, Patterns and Images, 2015 IEEE, pp. 126-133.

Das, A., et al., "Optical Flow Based Anomaly Detection in Traffic Scenes," 2017 IEEE International Conference on Computational Intelligence and Computing Research, 2017, 7 pages.

Mehendale, M., et al. "A True Multistandard, Programmable, Low-Power, Full HD Video-Codec Engine for Smartphone SoC," ISSCC 2012/Session 12/ Multimedia & Communications SoCs/ 12.7, 2012 IEEE International Solid-State Circuits Conference, pp. 226-228.

Patil, N., et al., "Global Abnormal Events Detection in Survelliance Video—A Hierarchical Approach," 2016 Sixith International Symposium on Embedded Computing and System Design (ISED), Patna 2016, pp. 2017-2222.

Patil, N., et al., "Video Anomaly Detection and Localization using 3D SL-HOF Descriptor," 2017 9th International Conference and Advances in Pattern Recognition (ICAR), Bangalore, India, 2017, 6 pages.

T. Surasak, et al. "Histogram of oriented gradients for human detection in video" 2018 5th International Conference on Business and Industrial Research (ICBIR), 2018, pp. 172-176; doi: 10.1109/ICBIR.2018.8391187. Year 2018.

* cited by examiner

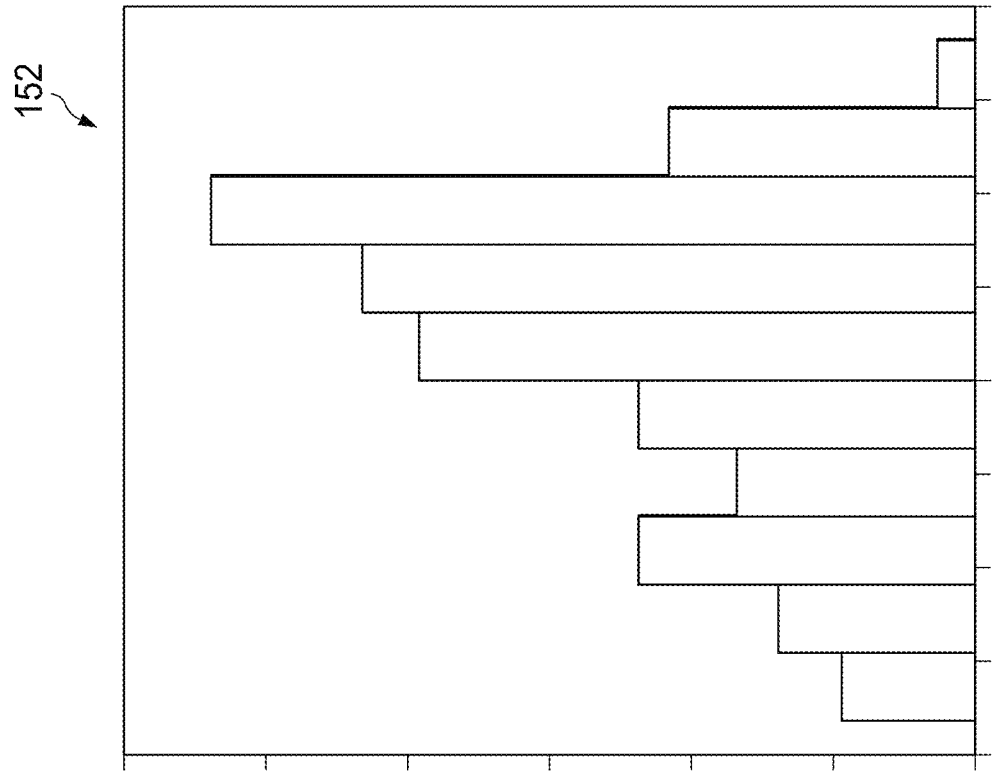
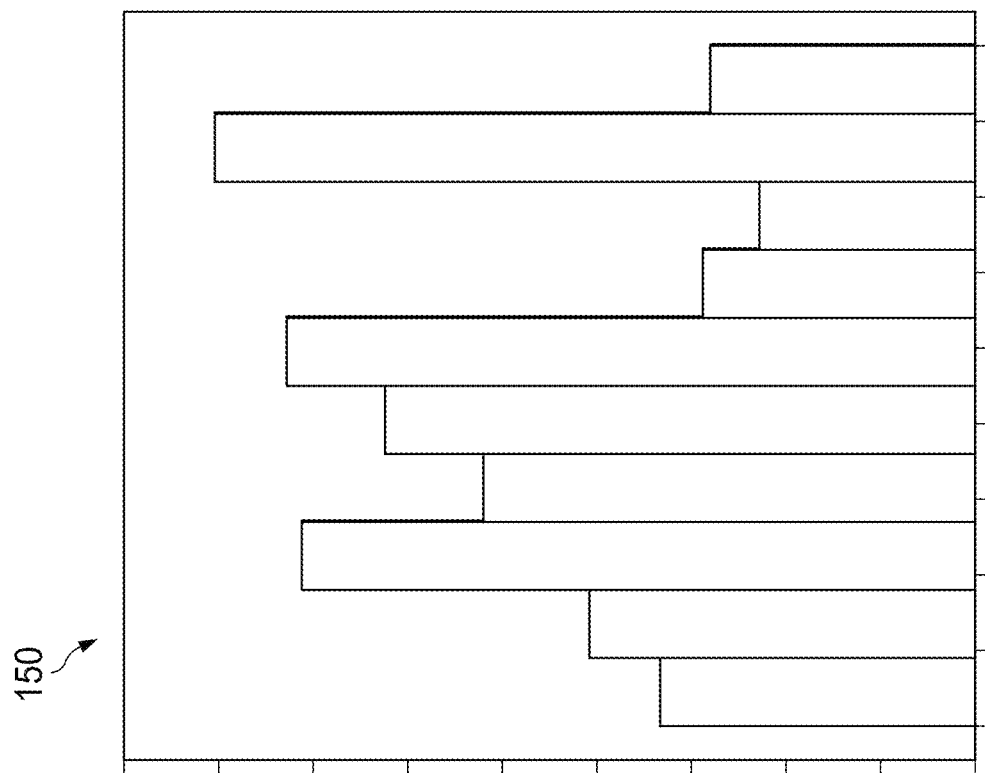
FIG. 5b
FIG. 5a

THREE DIMENSIONAL (3D) OBJECT DETECTION

CROSS-REFERENCE TO RELATED APPLICATIONS

This application is a continuation of U.S. patent application Ser. No. 17/875,559, filed Jul. 28, 2022, which is a continuation of U.S. patent application Ser. No. 16/869,387, filed May 7, 2020, now U.S. Pat. No. 11,403,859, issued Aug. 2, 2022, which is a continuation of U.S. patent application Ser. No. 16/017,148, filed Jun. 25, 2018, now U.S. Pat. No. 10,685,212, issued Jun. 16, 2020, each of which is incorporated herein by reference in its entirety.

BACKGROUND

Driven by advanced safety features, the automotive industry is increasing the number and variety of sensors deployed in vehicles, as well as the corresponding computational capacity in automotive systems. In particular, sensors are used to detect the vehicle surroundings, for example for collision warning and avoidance, adaptive cruise control, lane keeping, autonomous parking, and autonomous driving.

SUMMARY

An embodiment method for identifying regions of interest (ROIs) includes receiving, by a processor from a video camera, a video image and computing, by the processor, an optical flow image, based on the video image. The method also includes computing, by the processor, a magnitude of optical flow image based on the video image and computing a histogram of optical flow magnitudes (HOFM) image for the video image based on the magnitude of optical flow image. Additionally, the method includes generating, by the processor, a mask indicating ROIs of the video image, based on the HOFM.

An embodiment method for classifying objects includes obtaining, by a processor, a video image and computing, by the processor, an optical flow image for the video image. The method also includes computing, by the processor, a gradient of optical flow image based on the optical flow image and computing a histogram of normalized optical flow gradients (HOFG) image for the gradient of optical flow image. Additionally, the method includes classifying, by the processor, regions of the video image as three dimensional (3D) objects, flat features, or no object, based on the HOFG image, to generate an object classification and outputting, by the processor, the object classification.

An embodiment system includes a processor configured to receive a video image and compute an optical flow of the video image to produce an optical flow image. The system also includes a histogram generation circuit coupled to the processor, the histogram generation circuit configured to compute, in parallel, a first set of histograms of the optical flow image over a first block of a first set of blocks at a first scale and merge the first set of histograms, to produce a first output histogram for the first block at the first scale.

BRIEF DESCRIPTION OF THE DRAWINGS

FIGS. 5A-E illustrate example histograms;

DETAILED DESCRIPTION

Figure 1:
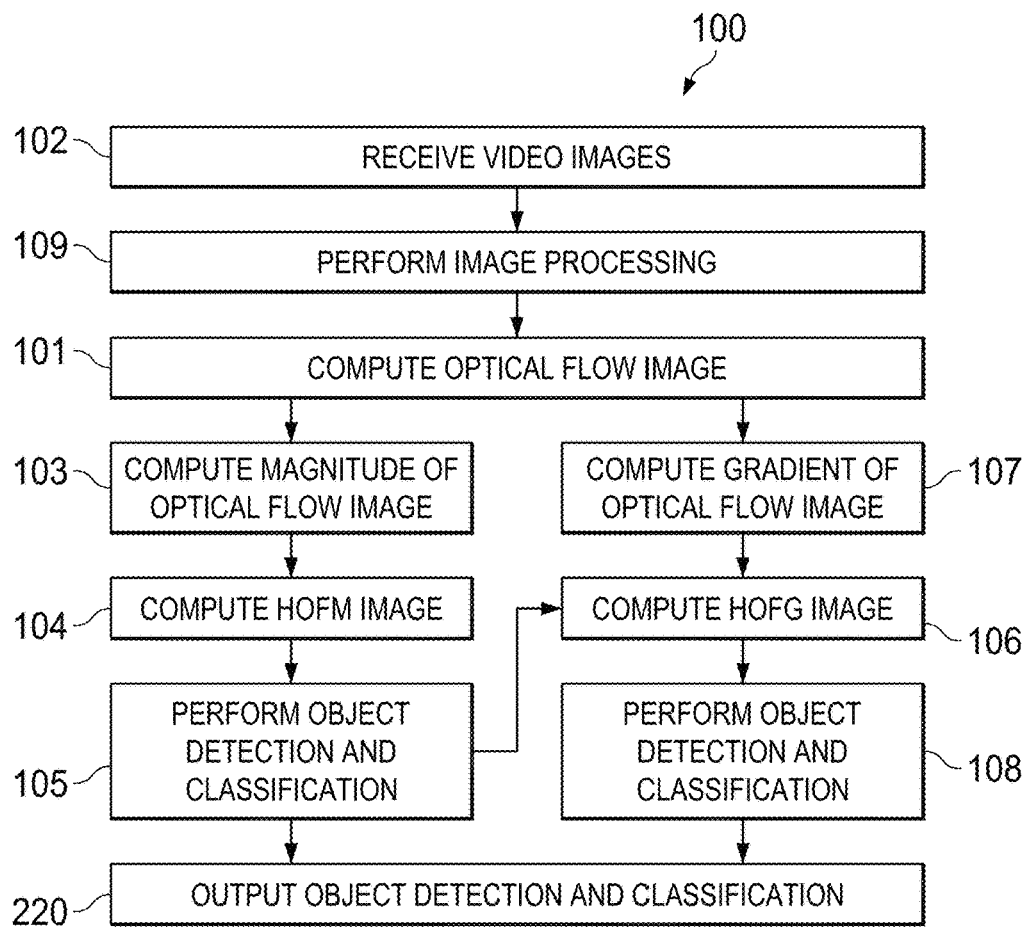
FIG. 1 illustrates a flowchart for an example method for detecting three dimensional (3D) objects.

In automotive applications, systems use a variety of sensors to detect surroundings of a vehicle. Radar sensors are well suited for detecting range and radial velocity, but are not well suited for angle estimation, detecting lateral velocity, boundary detection, or identifying small moving objects next to a large metal object. Video cameras are well suited for identifying objects and lateral velocity, but are not well suited for detecting radial velocity, and their performance degrades in bad weather conditions. Ultrasonic sensors have a low range and accuracy.

Object detection may be performed using a variety of techniques with various sensor types. Deep learning algorithms, based on learning data representations, are not designed for detecting objects of all kinds of shapes and sizes, and may have a hard time tracking moving objects. Feature based algorithms are also not designed for detecting objects of all kinds of shapes and sizes. One technique, optical flow image processing, is an image processing technique that analyzes the pattern of apparent motion of objects, surfaces, and edges in a visual scene, for example for video images received from video cameras. Sparse optical flow is a technique for analyzing videos at key points, to determine how objects in a captured scene change. In some examples of sparse optical flow, a system tracks 1000-2000 points in a video. Sparse optical flow has lower computational requirements than dense optical flow. However, in sparse optical flow, features may be noisy, leading to poor accuracy. In dense optical flow, the system tracks a large number of key points. Dense optical flow is more accurate than sparse optical flow, but may be too computationally intense to be practical, especially in real time. It is desirable to detect three dimensional (3D) objects in a video stream. In particular, it is desirable to differentiate 3D objects from flat features, such as shadows, lines, and textures.

An embodiment detects and identifies three dimensional (3D) objects using semi-dense regular optical flow feature sets computed from video streams. The system analyzes any small blocks, such as 8×8 pixel blocks, 16×16 pixel blocks, 4×4 pixel blocks, 8×4 pixel blocks, 4×8 pixel blocks, 2×2 pixel blocks, or another small block size. An embodiment computes two unique feature vectors, the histogram of optical flow magnitudes (HOFM) and the histogram of normalized optical flow gradients (HOFG). An example system uses a learning algorithm to build a classification system, so a set of feature vectors in a given region is associated surface features or 3D objects. Examples of surface feature in an automotive environment include a flat road, flat road features, such as parking markings, lane markings, cracks, or other surface features, such as crosswalk markings. Also, examples of 3D objects in an automotive environment include vehicles, people, animals, debris, or other obstacles. Embodiments employ hardware and software to compute the feature vectors and perform the learning algorithm quickly for low latency decision making. An example histogram circuit computes multiple histograms in parallel and merges the multiple histograms, for determining an HOFM image and an HOFG image. In an embodiment, master and slave histogram circuits update bins in parallel, to compute the HOFM image and the HOFG image.

FIG. 1 illustrates a flowchart 100 for an example method of detecting 3D objects. The method illustrated by the flowchart 100 may be implemented in hardware, software, or a combination of hardware and software. In block 102, the system receives video images in a stream from a video camera. The video camera may be mounted on a vehicle, such as an automobile. In an embodiment, the video camera has a wide angle lens, e.g., a fish eye lens. The video camera has an optical sensor (e.g., an image sensor), such as a complementary metal-oxide-semiconductor (CMOS) sensor or a charge coupled device (CCD) sensor.

In block 109, the system performs image processing on the video images received in the block 102. A processor, such as an image signal processor (ISP), performs image processing on the raw image data (e.g., the images) received from the camera in the block 102. For example, the processor may perform Bayer transformation, demosiacing, noise reduction, or image sharpening. In Bayer transformation, the processor determines an RGB value for each pixel based on a pattern designated by the Bayer filter. In demosiacing, the processor evaluates the color and brightness data of a pixel, compares the color and brightness data with the color and brightness data from neighboring pixels, and uses a demosiacing algorithm to produce an appropriate color and brightness value for the pixel. The processor may also access the picture as a whole to ensure the correct distribution and contrast, for example by adjusting the gamma value. In noise reduction, the processor separates noise from the video image to remove noise, for example by filtering the video image. In image sharpening, the processor sharpens edges and contours using edge detection. Image sharpening may be performed to compensate image softening that was introduced by the noise reduction.

In block 101, the system computes an optical flow image by computing the optical flow values between consecutive video images of the video images processed in the block 109. For example, a processor of the system computes the optical flow between consecutive video images of the stream of video images. The processor may compute the optical flow using a variety of algorithms, such as phase correlation, block-based methods, differential methods, or discrete optimization methods. In phase correlation, the processor computes the inverse of the normalized cross-power spectrum. In block-based methods, the processor minimize the sum of squared differences or the sum of absolute differences, or maximizes the normalized cross-correlation. Differentiation methods include the Lucas-Kanade method, the Horn-Schunck method, the Buxton-Buxton method, the Black-Jepson method, or general variational methods. In discrete optimization methods, the processor quantizes the search space, and addresses image matching through label assignment at each pixel, so the corresponding deformation minimizes the distance between the source video image and the target video image. The optical flow image has a value of (u, v) for each pixel, where u indicates the optical flow (or motion) in the x direction and v indicates the optical flow (or motion) in the y direction. In other words, the optical flow image may be a vector field (or motion field) with a vector (u, v) for each pixel. Each vector may represent the estimated motion of the image content at a corresponding pixel. In some examples, the vector (u, v) may correspond to a displacement vector that represents the estimated displacement of the image content at the pixel from one image to another where u represents the horizontal displacement component and v represents the vertical displacement component. In additional examples, the vector (u, v) may correspond to a velocity vector that represents the estimated velocity (or motion) of the image content at the pixel (e.g., instantaneous velocity) where u represents the horizontal velocity component and v represents the vertical velocity component. The optical flow may be computed by an imaging and video accelerator (IVA) circuit, by a programmable processor, or by optical flow hardware.

Then, in block 103, the system computes the magnitude of optical flow image, which contains the magnitude of the optical flow for each of the pixels in the optical flow image as the pixel value for the magnitude of optical flow image. The magnitude of optical flow value for a pixel is given by:

$$\sqrt{u_x^2 + u_y^2}.$$

The system computes the magnitude of optical flow for each pixel to generate the magnitude of optical flow image.

In block 104, the system computes an HOFM image based on the magnitude of optical flow images computed in the block 103. The system divides the magnitude of optical flow image into a set of overlapping or non-overlapping blocks. The system computes an HOFM image by computing an HOFM value for each block in the magnitude of optical flow image. In an embodiment, the system computes an HOFM image on multiple sets of blocks for each of N scales, where N is an integer greater than 1, for example 7, 8, 9, 10, 11, or 12. In other embodiments, N is 2, 3, 4, 5, or 6. Different scales may correspond to different sizes of blocks into which the system computes the magnitude of optical flow. The different scales may be well suited for detecting and classifying objects that have sizes similar to the block size for that scale. Therefore, large blocks may be useful to classify and detect large objects and small blocks may be useful to classify small objects in the video image. In one embodiment, a histogram circuit computes the HOFM image. Alternatively or additionally, a programmable processor computes the HOFM image.

Next, in block 105, the system performs object detection and classification based on the HOFM image computed in the block 104. For example, a processor uses a learning algorithm detects objects based on the HOFM image. The processor may also use the learning algorithm to classify the objects. The system identifies regions of interest (ROIs) as regions containing at least one detected object. Also, the system generates a mask identifying the ROIs and excluding regions which are not ROIs.

In block 107, the system computes a gradient of optical flow optical image by computing the direction of optical flow vector for the pixels in the optical flow image. The gradient of optical flow for a pixel indicates the angle of the optical flow vector of the pixel. The gradient of optical flow value for a pixel is given by:

$$\tan^{-1}\left(\frac{u_y}{u_x}\right).$$

The system computes the gradient of optical flow vector for each pixel of the optical flow image to generate a gradient of optical flow image.

In block 106, the system computes an HOFG image by computing an HOFG value for pixels or blocks of the gradient of optical flow image computed in the block 107. In an embodiment, the system divides the gradient of optical flow image into overlapping or non-overlapping blocks. The system computes the HOFG value for each block by computing a histogram for each block of the gradient of optical flow image. In some embodiments, the system also computes the HOFG image based on the mask from the block 104, for example by only computing the HOFG value in the regions indicated by the mask. In one embodiment, the system computes the HOFG value over the entire gradient of optical flow image. In another embodiment, the system computes the HOFG value only some regions, for example in regions of the gradient of optical flow image that correspond to the ROIs identified by the mask. The system may compute the HOFG image on multiple scales with multiple sets of blocks. In an embodiment, the system uses the same set of scales for computing the HOFM image and the HOFG image. In another embodiment, the system uses different sets of scales for computing the HOFM image and the HOFG image. In some embodiments, the system only computes the HOFG image, and does not compute the HOFM image.

In block 108, the system performs object detection and classification for the video image based on the HOFG image computed in the block 106. The system uses a learning algorithm based model to identify objects. The system classifies the identified objects by category, for example as 3D objects, flat features, or no object regions.

In block 220, the system outputs the object identification and classification determined in the block 105 and/or the block 108. In an embodiment, the system displays the object identification and classification to a user, for example to a driver to assist the driver in driving or parking. In another example, another function in an advanced driving assistance system (ADAS) directly uses the object identification and classification, for example to prevent collisions.

Figure 2:
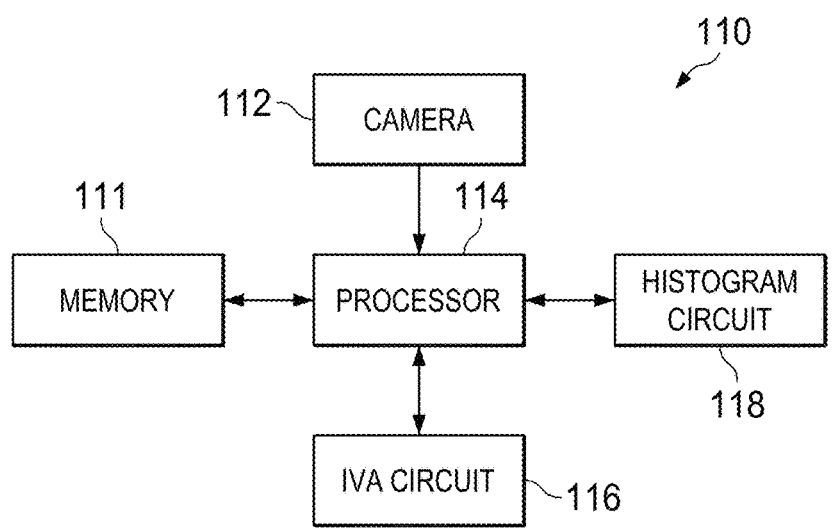
FIG. 2 illustrates an example system for detecting 3D objects.

FIG. 2 illustrates a system 110 for detecting 3D objects. In an embodiment, the system 110 is implemented on a system-on-a-chip (SoC), for example a Keystone-3™ platform device or a TDA4Rx™ SoC, produced by Texas Instruments. The system 110 includes processor 114, coupled to cameras 112, memory 111, histogram circuit 118, and imaging and video accelerator (IVA) circuit 116. The video camera 112 is mounted on a vehicle, such as an automobile, pointing in any direction. The video camera 112 may contain a CCD sensor or CMOS video sensor. In an embodiment, the video camera 112 has a wide angle lens or a fish eye lens, to view a wide field-of-view. The system 110 may contain multiple video cameras 112. For example, a vehicle has four video cameras 112 mounted on each of its four sides, to obtain views of its surroundings in all directions.

The processor 114 receives a video stream from the video camera 112. The processor 114 may be a general purpose processor, a digital signal processor (DSP), or another processor, for example a specialized processor. In some embodiments, multiple processors are present in the system 110. The processor 114 may run or execute instructions stored on a non-transitory storage medium, for example the memory 111.

The memory 111 is coupled to the processor 114. In an embodiment, the memory 111 is a double data rate (DDR) synchronous dynamic random-access memory (SDRAM) or another type of non-transitory storage medium. The processor 114 may run or execute instructions stored on the memory 111. Also, the memory 111 may store histogram-based data structures.

The histogram circuit 118 is coupled to the processor 114. The histogram circuit 118 contains digital hardware for computing histograms in parallel. In one embodiment, multiple histogram circuits 118 are present. For example, a first histogram circuit computes the HOFM image and a second histogram circuit computes the HOFG image. In an embodiment, the same histogram circuit computes the HOFM image and the HOFG image. The histogram circuit 118 computes the histograms for multiple pixels in parallel, and merges the results, to generate histogram output.

The IVA circuit 116 is coupled to the processor 114. The IVA circuit 116 computes the optical flow values and/or the optical flow images. The IVA circuit includes a motion estimation acceleration engine (IME3). IME3 uses pixel correspondence searching to find the best match between the current frame and reference frames. In some embodiments, the IVA circuit 116 is not present, and software run on a processor or specialized hardware computes the optical flow.

Figure 3A:
FIGS. 3A-E illustrate an example method of histogram optical flow magnitudes (HOFM)
Figure 3B:

FIGS. 3A-E illustrate an example method of identifying ROIs using an HOFM image. FIG. 3A illustrates video image 120, which is a frame of a video stream received from a video camera. The video image 120 has a width of W pixels and a height of H pixels. A system, for example a processor, computes the gradients of the video image 120 in the x ($I_x$) and y ($I_y$) directions, and in time ($I_t$). $I_x$, $I_y$, and $I_t$ are functions of the pixel values within the window of a given pixel. Then, the system generates optical flow image 122, illustrated in FIG. 3B. The system computes the optical flow value for a pixel using the following equation:

$$\begin{bmatrix} \sum_w I_x^2 & \sum_w I_x I_y \\ \sum_w I_x I_y & \sum_w I_y^2 \end{bmatrix} \begin{bmatrix} u_x \\ u_y \end{bmatrix} = \begin{bmatrix} \sum_w I_x I_t \\ \sum_w I_y I_t \end{bmatrix},$$

where w is the window for computing optical flow, $I_x$ is the gradient in the x direction, $I_y$ is the gradient in the y direction, $I_t$ is the gradient in time, u indicates the optical flow in the x direction, and v indicates the optical flow in the y direction. The system computes the values for u and v for the pixels according to the above equation, to generate an optical flow pixel vectors, constituting the optical flow pixel image.

Figure 3C:
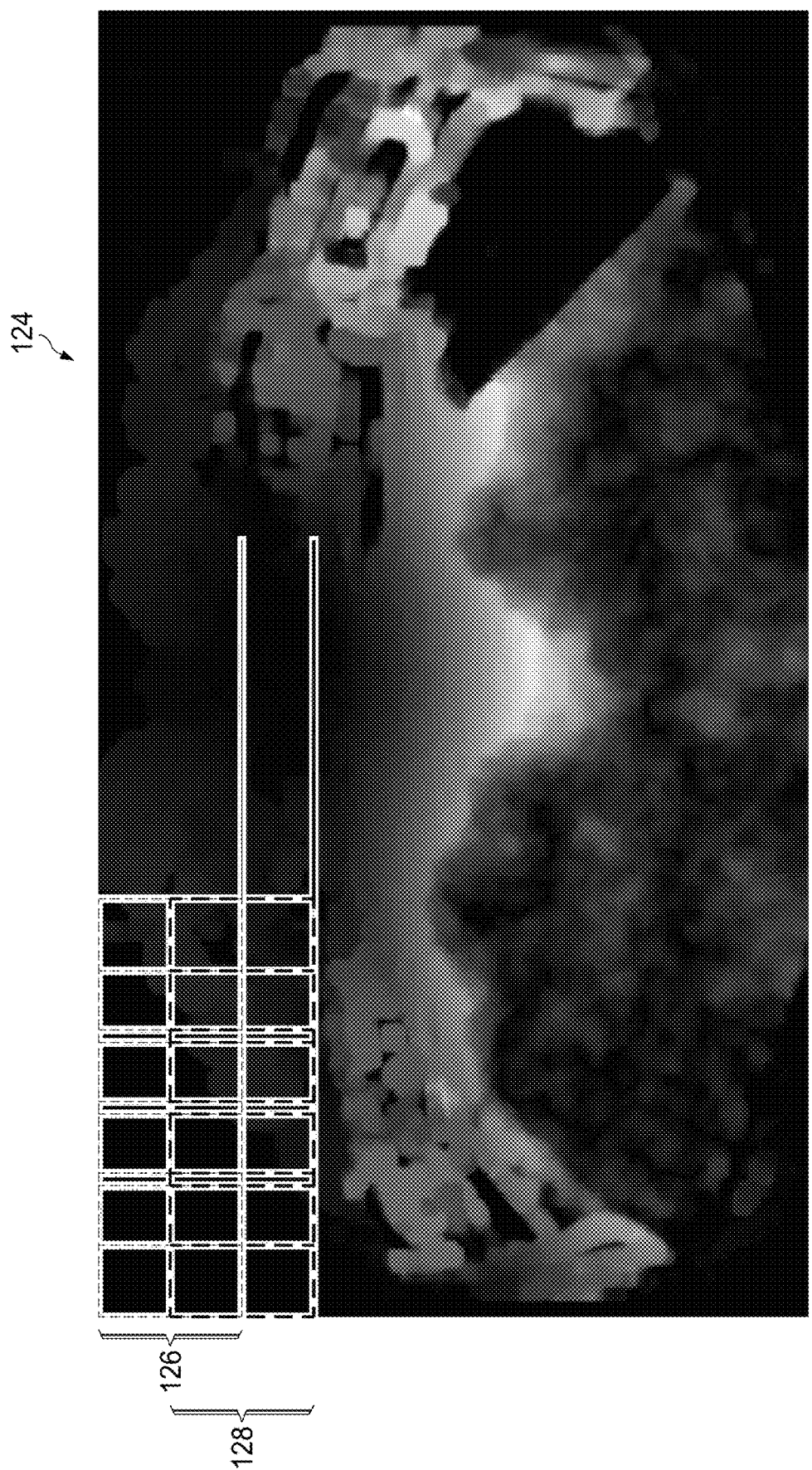

The system assigns overlapping blocks to the optical flow image 122, to generate block image 124 in FIG. 3C. Blocks 126 and blocks 128 indicate overlapping blocks. In some embodiments, non-overlapping blocks are used. The system generates multiple sets of blocks for multiple scales, for example for N scales, where N is an integer greater than 1. The system generates blocks of size X(s) by Y(s) in the optical flow image 122, where s indicates the scale and X(s) and Y(s) indicate the block size (or block dimensions, e.g., X(s) indicates the block width in the horizontal direction and Y(s) indicates the block height in the vertical direction).

Figure 3D:
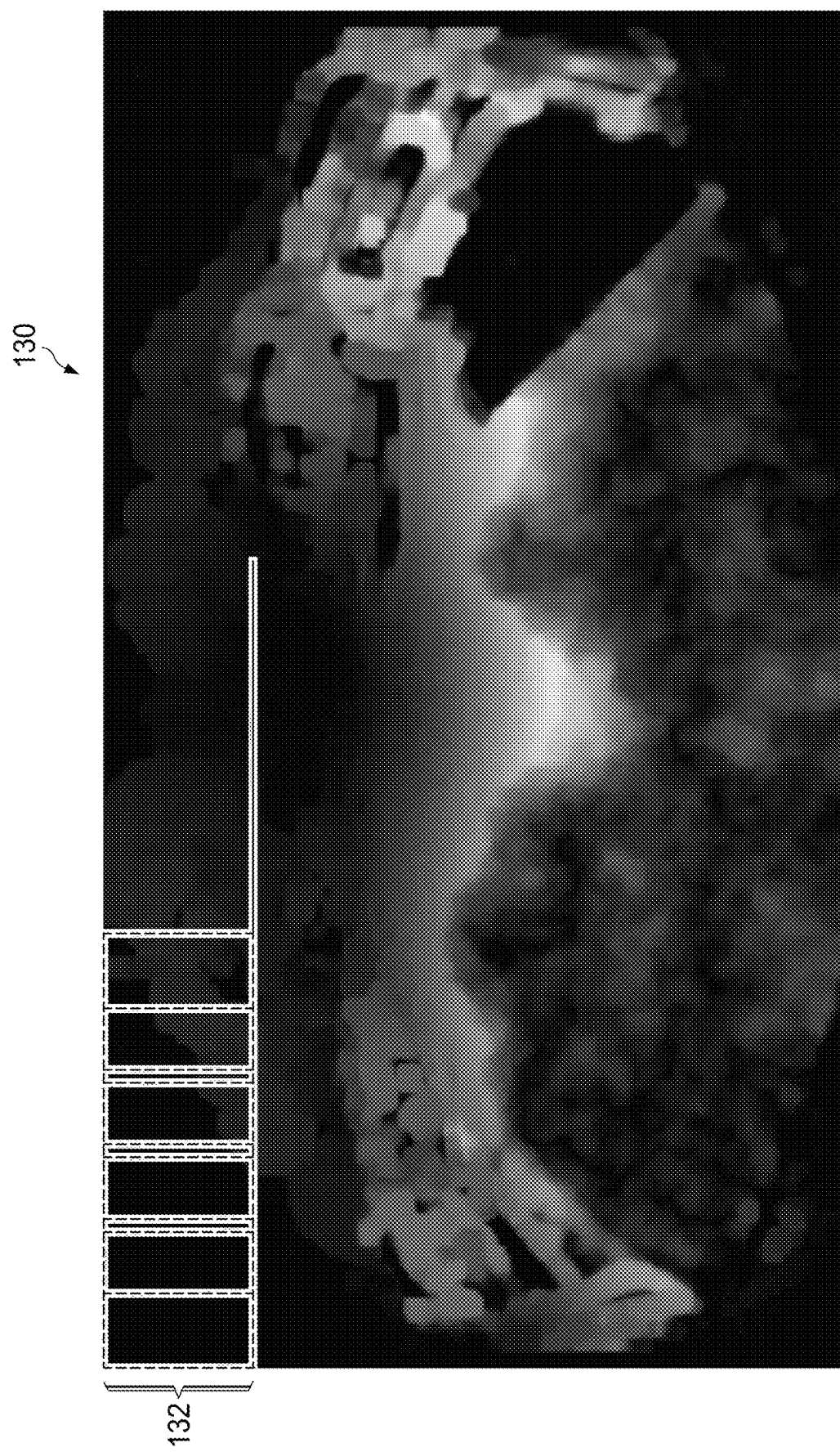

The system computes the magnitude of optical flow value on pixels of the optical flow image, to generate a magnitude of optical flow image. Then, the system computes histograms of the magnitude of optical flow image over at least one set of blocks, to generate at least one HOFM image. In an embodiment, the system computes a separate HOFM image for each of the N scales, producing an N dimensional histogram with B bins. FIG. 3D illustrates the magnitude of optical flow image 130 with blocks 132. The system computes the HOFM value by incrementing the bin value, $\text{HOFM}_{i,j,k,b}$, when P(x, y) has a value within the range of values for bin b, where:

$$P(x, y) = \text{magnitude}(x, y) = \sqrt{u_x^2 + u_y^2},$$

where (i, j) are the coordinates of the block, k indicates the scale, u indicates the optical flow in the x direction, and v indicates the optical flow in the y direction, and b indicates the bin. The system computes the HOFM value for i from 0 to:

$$\left\lceil \frac{W}{X(s)} \right\rceil - 1,$$

for j ranging from 0 to:

$$\left\lceil \frac{H}{Y(s)} \right\rceil - 1,$$

for k over scales ranging from 0 to N−1, and for b from 0 to B−1, where B is the number of bins, for non-overlapping blocks. More blocks are present when the system uses more overlapping blocks. The hardware and/or software may compute the HOFM image.

Figure 3E:
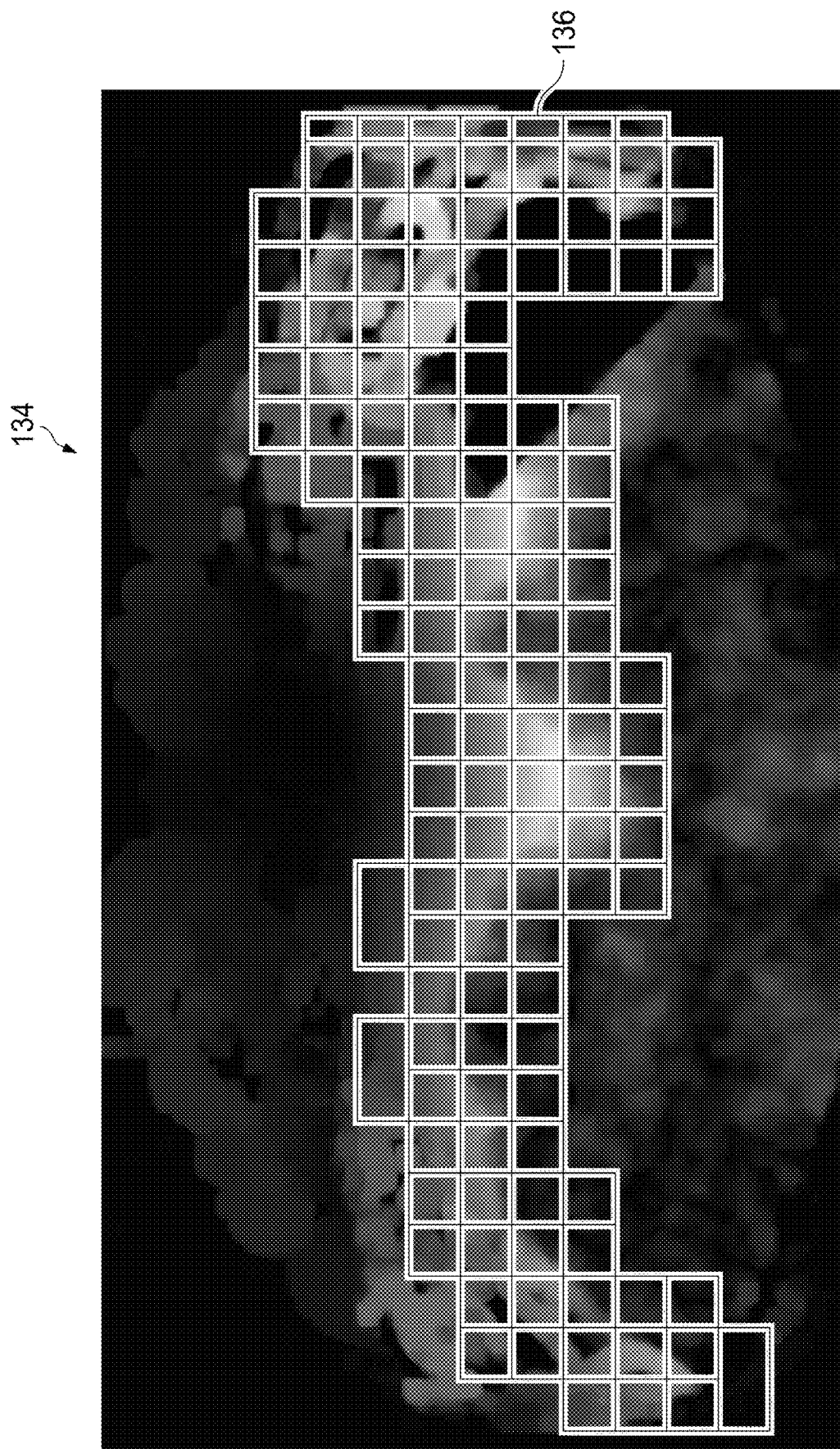

Based on the HOFM image, the system identifies ROIs of the optical flow image. FIG. 3E illustrates the optical flow image 134, with ROIs 136. In an embodiment, the system uses a learning algorithm to identify the ROIs, to differentiate the ROIs from regions that are not ROIs. The system may use the learning algorithm to identify regions likely to be either a 3D object or a flat feature as ROIs, and exclude regions with no objects. In some embodiments, the system uses a model produced by a learning algorithm, such as decision tree learning, a support vector machine (SVM), or deep learning algorithm, to identify the ROIs. With decision tree learning, the system uses a predictive model with a decision tree, which maps observations about an item to determine whether a region is an ROI or not an ROI. SVMs are supervised learning models with associated learning algorithms that the system uses to analyze data for classification and regression examples. Using a set of training examples, marked as belonging to either an ROI or a region that is not an ROI, the SVM training algorithm builds a model that assigns new examples to either a ROI or not an ROI, generating a non-probabilistic binary linear classifier. The system maps new examples into the space and predicts these examples to be either an ROI or not an ROI. With deep learning, a system uses multiple hidden layers in an artificial neural network to model the manner that the human brain processes light. Deep learning may be supervised, semi-supervised, or unsupervised. Example deep learning architectures include deep neural networks, deep belief networks, convolution neural networks, and recurrent neural networks. The system may generate a mask indicating the ROIs.

Figure 4A:
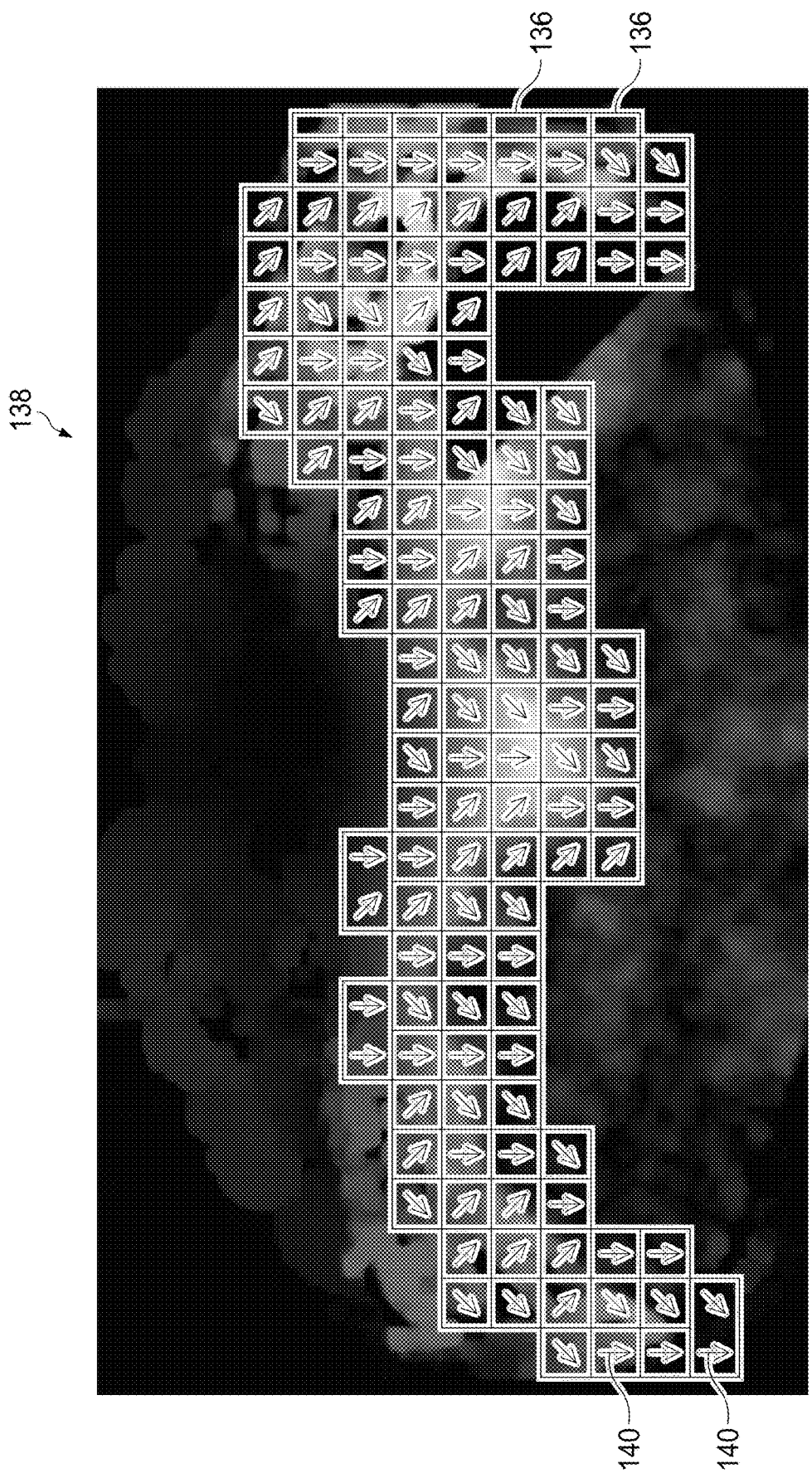
FIGS. 4A-B illustrate an example method for performing a histogram of normalized optical flow gradients (HOFG) technique.
Figure 4B:
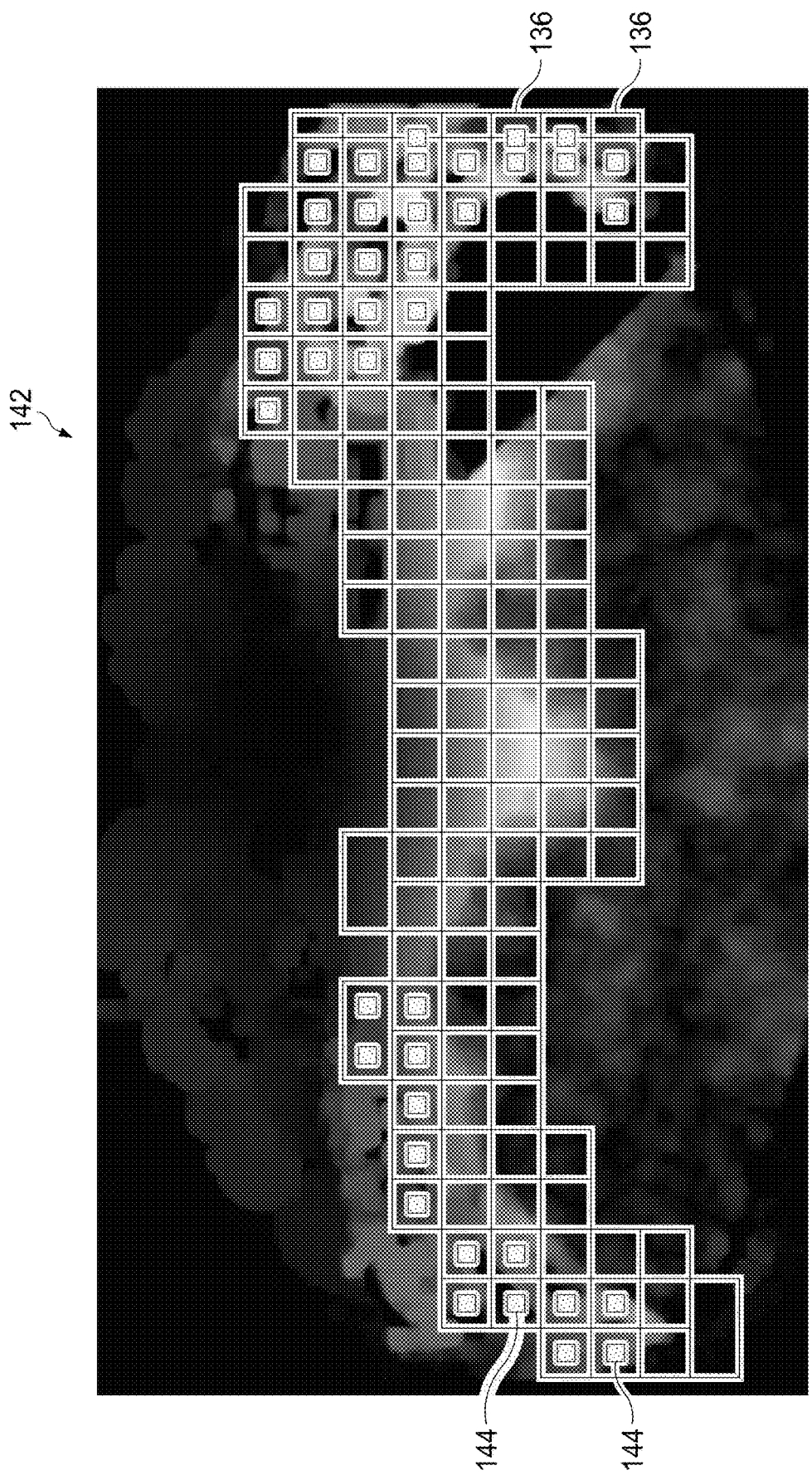

FIGS. 4A-B illustrate the detection of 3D objections using the HOFG image. The system uses ROIs 136, illustrated in optical flow image 134 (FIG. 3E), to calculate the HOFG image. The system computes the gradient of optical flow across regions of the optical flow image 134, and only in the ROIs 136 identified by the mask. In additional embodiments, the system computes the gradient of optical flow across the whole optical flow image. The system computes the gradient of optical flow, which indicates the direction of the optical flow, using:

$$\tan^{-1}\left(\frac{u}{v}\right),$$

where u and v are the optical flow in the x and y directions, respectively. The FIG. 4A illustrates the gradient of optical flow image 138, with gradients 140 illustrated in the ROIs 136.

The system computes the gradient of optical flow value for pixels in the image, to generate the gradient of optical flow image. The system may compute the gradient of optical flow value on the entire gradient of optical flow image, or only in the ROIs. The system computes the HOFG value on pixels of this gradient of optical flow image, to generate the HOFG image. In another embodiment, the system computes the HOFG value for the entire gradient of optical flow image. The system increments an HOFG bin value, $\text{HOFG}_{i,j,k,b}$, for the bin b, when the gradient of optical flow value for a pixel falls in the range of bin b, where i and j are the block coordinates of the block that includes the pixel, k indicates the scale, and b indicates the bin number. The system may compute multiple HOFG images for multiple sets of overlapping or non-overlapping blocks over multiple scales of block sizes. For non-overlapping blocks, the value of i is between 0 and:

$$\left\lceil \frac{W}{X(s)} \right\rceil - 1,$$

and the value of j is between 0 and:

$$\left\lceil \frac{H}{Y(s)} \right\rceil - 1,$$

where k, which is between 0 and N−1, indicates the scale. With overlapping blocks, the system may compute more values may, depending on the degree overlap of the blocks. In an embodiment, the system uses the same set of scales and sets of overlapping blocks for computing the HOFM image and for computing the HOFG image. In another embodiment, the system uses different sets of scales and/or different sets of overlapping blocks for computing the HOFM image and for computing the HOFG image.

Figure 5D:
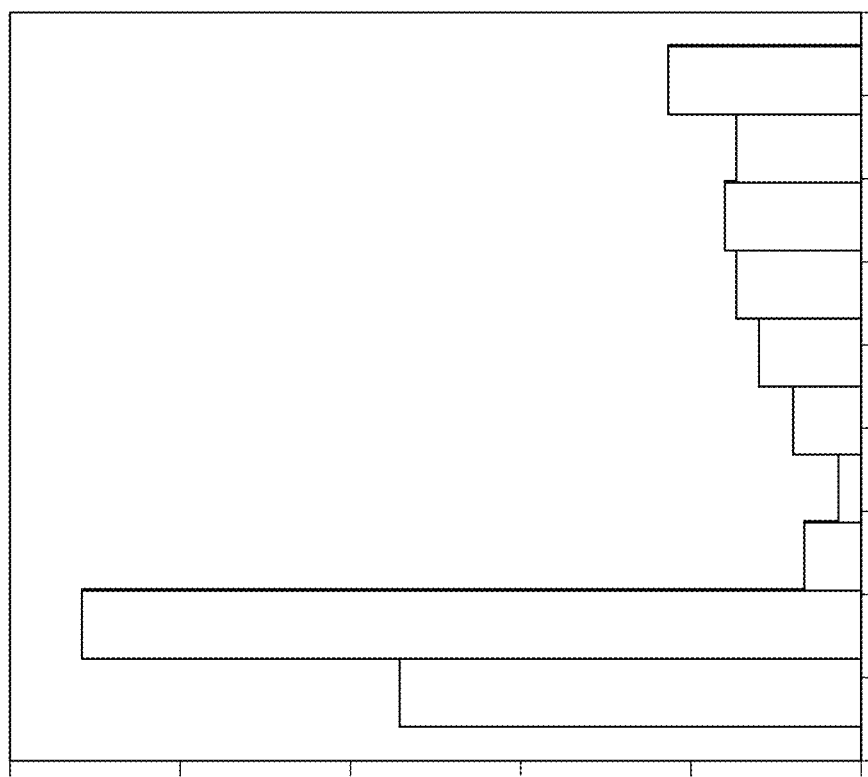
Figure 5C:
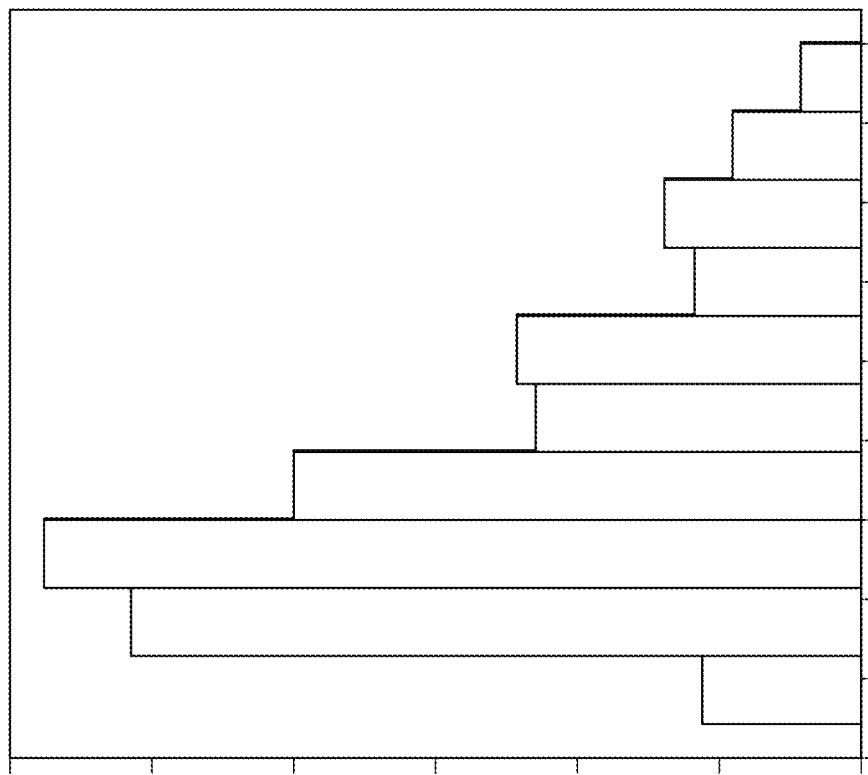
Figure 5E:
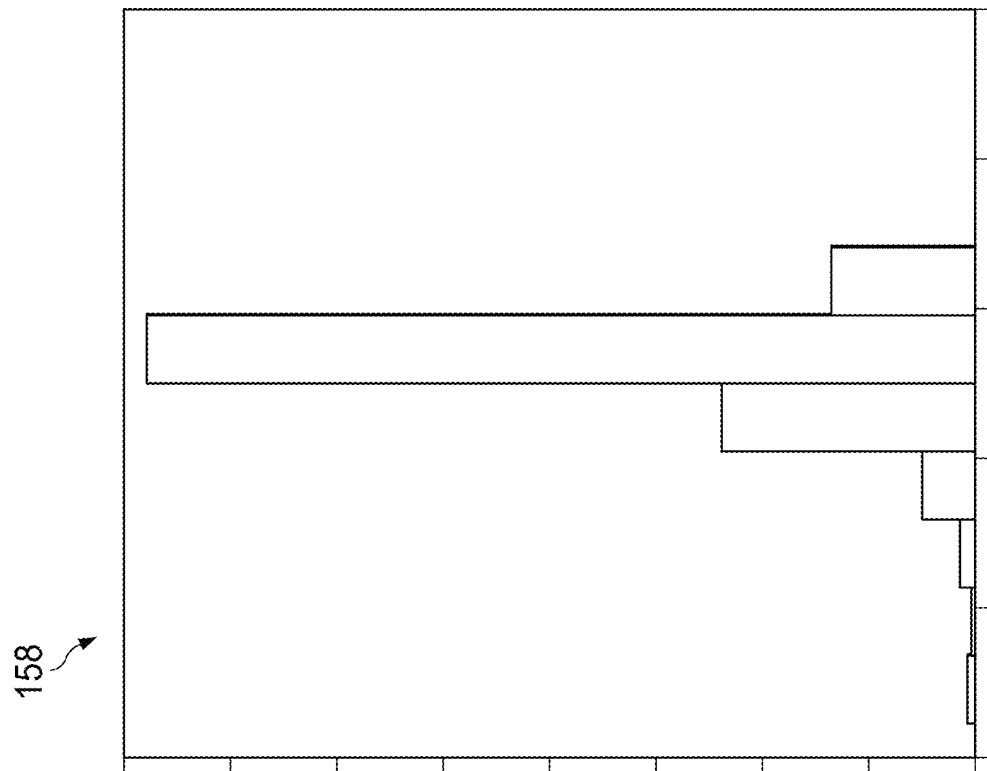

FIGS. 5A-E illustrate example histograms for HOFG with 9 bins. FIG. 5A illustrates histogram 150 for a block with no object and a small value for the magnitude of optical flow for that block. FIG. 5B illustrates histogram 152 for a block with a flat area with a high HOFG values due to flat features, such as ground texture or lane markings. FIG. 5C illustrates histogram 154 for a block with another flat area with a high HOFG values due to flat features, such as ground texture or lanes, or other markings. Also, FIG. 5D illustrates histogram 156 for a block with a 3D object. FIG. 5E illustrates histogram 158 for another block with a 3D object.

After the system computes the HOFG image, the system uses a learning algorithm based model to classify regions based on the HOFG image. The system uses a learning algorithm, such as a decision tree algorithm, SVM, or a deep learning algorithm, to classify regions as a 3D object, a flat feature, or not an object. FIG. 4B illustrates classification image 142, in which ROIs 136 are classified based on the HOFG image. The 3D objects may be flagged for special interest, for example as 3D objects to be avoided. The flat features may also be identified, for example as lane features or other markings.

Figure 6:
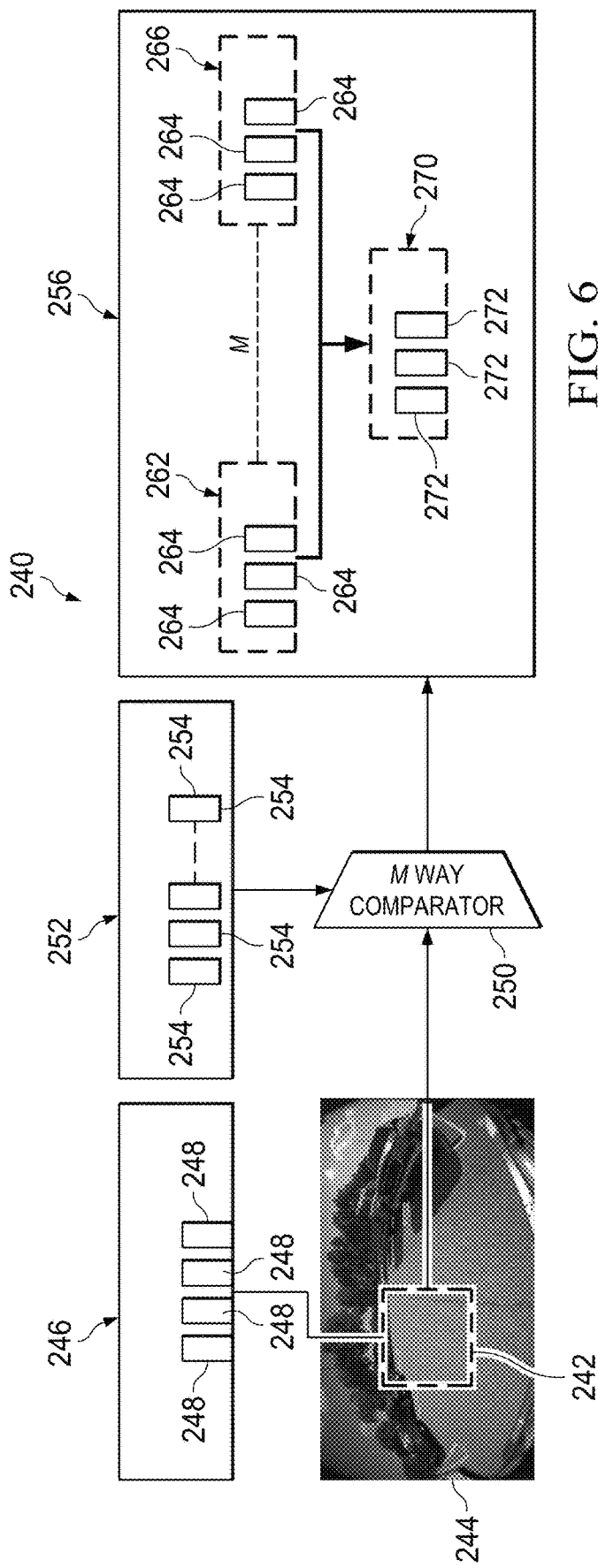
FIG. 6 illustrates an example histogram generation circuit.

In an embodiment, a histogram circuit generates histograms on-the-fly. In an embodiment, a histogram circuit generates histograms in a pipelined manner, by generating histograms for a block in parallel, before proceeding to the next block. FIG. 6 illustrates histogram generation circuit 240, a digital circuit for generating histograms in parallel. The histogram generation circuit 240 includes register block 246, register block 252, M way comparator 250, and histogram merging circuit 256. In an embodiment, the histogram generation circuit 240 generates an HOFM image and an HOFG image. In one embodiment, the system uses separate histogram generation circuits to generate the HOFM image and the HOFG image. In another embodiment, the same histogram generation circuit 240 generates both the HOFM image and the HOFG image. The histogram generation circuit 240 updates multiple bins in parallel, with one bin per pixel. Then, the histogram generation circuit 240 combines the multiple parallel bins, to generate one set of bins for a block. Accordingly, the histogram generation circuit 240 generates histograms, such as an HOFM image or an HOFG image, in a parallel processes. The histogram generation circuit 240 may be used for other applications involving histogram computation, such as generating histogram signatures. The histogram generation circuit 240 receives an image 244 for histogram computation. The image 244 may be a regular video image or video frame, a magnitude of optical flow image, or a gradient of optical flow image, for computing the histogram. The register block 246 contains configuration registers 248, which store ranges for the portion of the image 244 for histogram generation. In an example, the configuration registers 248 contain the minimum x value, the maximum x value, the minimum y value, and the maximum y value, for an ROI block range, for example for the ROI 242 of the image 244. In another embodiment, the configuration registers 248 contain the x minimum, center, or maximum value, the x block size, the y minimum, center, or maximum value, and the y block size. The configuration registers 248 output the values for the ROI 242 to the M way comparator 250.

The register block 252 includes configuration registers 254, which contain B−1 bin thresholds, where B, which is configurable, indicates the number of bins for the histogram. The histogram merging circuit 256 contains histograms 262 to 266 and master histogram 270. The M way comparator 250 receives the ROI 242 containing a block of M pixels and the B−1 bin thresholds from the configuration registers 254. The M way comparator compares each of the M pixels in parallel to the B−1 bin thresholds. The M way comparator 250 produces M histograms, one histogram for each of M pixels of the image, generating histograms 262 to 266 in the histogram merging circuit 256. Each of histograms 262 to 266 contains registers 264, one register for each of B bins, where the bins of each histogram indicate the histogram values for one pixel of the M pixels in the ROI 242. In an embodiment, each of histograms 262 to 266 has one bin with a value of 1, indicating the bin to which the corresponding pixel belongs, and the remaining bins have a value of 0. The histogram merging circuit 256 generates the master histogram 270, with the bins 272, B bins, by adding the bins of the histograms 262 to 266 together. The histogram merging circuit 256 combines the M histograms 262 to 266 to produce the master histogram 270. M is an integer, for example 64, 256, or 1024.

An example histogram generation circuit has a gate count of about 45,000 gates. In an embodiment, where M is the number of pixels computed in parallel, and B is the number of bins, the histogram generation circuit contains B 1-bit shadow registers, 16 bit master registers, 16 bit configuration registers, 151 million comparator gates, and an 100 gate decoder. For example, an embodiment where M=128 pixels and B=16 bins, has about 44,000 gates. For a 16 way A>B decoder, there are approximately 136 AND gates and 15 XNOR gates.

Figure 7:
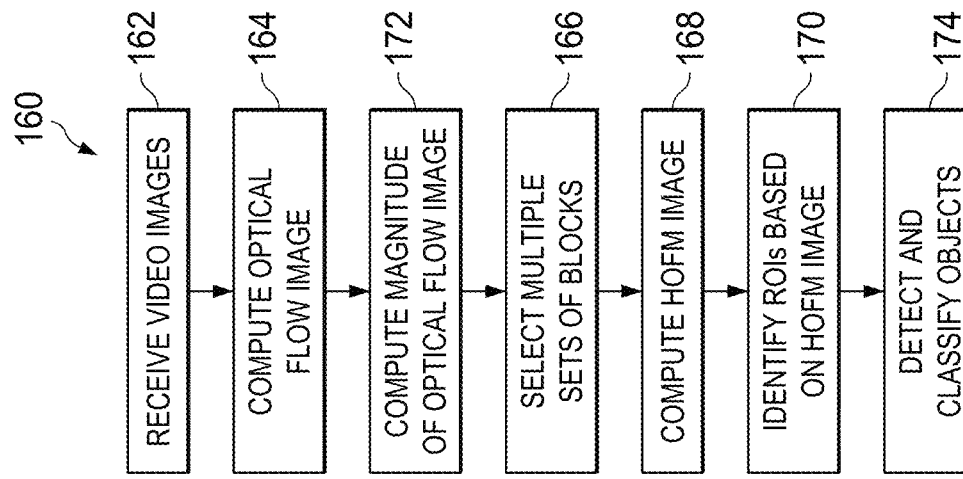
FIG. 7 illustrates a flowchart for an example method for identifying regions of interest (ROIs) in a video image.

FIG. 7 illustrates flowchart 160 for an example method of identifying ROIs in a video by computing an HOFM image. A system, for example an SoC using hardware and/or software, performs the method illustrated by the flowchart 160. In block 162, the system receives video images. For example, the system receives a stream of video frames from a video camera mounted on a vehicle, such as an automobile. The camera may have a CMOS or CCD video sensor with wide angle or fish eye lens.

In block 164, the system computes the optical flow image for the video images received in the block 162. The optical flow image is an image that has pixel values representing the value of the optical flow vector for that pixel. The system computes the gradients of the pixels in the x and y directions, and in time, $I_x$, $I_y$, and $I_t$. Then, the system computes, for the pixels, the optical flow vector values u and v in the x and y direction, where u indicates the optical flow in the x direction and v indicates the optical flow in the y direction. The system computes the optical flow by solving, for u and v:

$$\begin{bmatrix} \sum_w I_x^2 & \sum_w I_x I_y \\ \sum_w I_x I_y & \sum_w I_y^2 \end{bmatrix} \begin{bmatrix} u \\ v \end{bmatrix} = \begin{bmatrix} \sum_w I_x I_t \\ \sum_w I_y I_t \end{bmatrix},$$

where x is the pixel position in the x direction, y is the pixel position in the y direction, t indicates time, w is the optical flow window, $I_x$ is the gradient in the x direction, $I_y$ is the gradient in the y direction, and $I_t$ is the gradient in time. The block 164 may be performed in software by a processor, such as a general purpose processor or a DSP. In another embodiment, an optical flow digital circuit, such as an off-chip optical flow accelerator or co-processor, performs the block 164.

In block 172, the system computes the magnitude of optical flow image, which contains pixels having magnitude of optical flow values based on the optical flow image computed in the block 164. The magnitude of optical flow for a pixel is given by:

$$\sqrt{u^2 + v^2},$$

where u is the optical flow in the x direction for the pixel and v is the optical flow in the y direction for the pixel. In an embodiment, a processor, for example a DSP or a general purpose processor, performs the block 172.

In block 166, the system selects blocks for computing histograms. The blocks may be overlapping blocks or non-overlapping blocks. In an embodiment, the system selects multiple sets of blocks for the optical flow image at multiple scales. The blocks have locations of X(s) and Y(s), for example the starting point of the block, where s indicates the scale of the set of blocks. The system computes N scales, where N is an integer greater than 1. For example, for N=9, the system selects 4×4 pixel blocks, 8×8 pixel blocks, 16×16 pixel blocks, 32×32 pixel blocks, 64×64 pixel blocks, 128×128 pixel blocks, 256×256 pixel blocks, 512×512 pixel blocks, and 1024×1024 pixel blocks. The selected blocks may be stored in memory, for example DDR SDRAM. In one embodiment, in the block 166, the system reads multiple sets of blocks out of the memory. In an embodiment, software on a processor, such as a general purpose processor or a DSP, performs the block 166.

In block 168, the system computes the HOFM image for blocks in the magnitude of optical flow image that spatially correspond to the blocks selected in the block 166. The system determines the bin b to which the magnitude of optical flow value for a pixel of the magnitude of optical flow image belongs, for the block (i, j), for the scale k. The system increments the bin value for $HOFM_{i,j,k,b}$. The system may compute the HOFM values for each block over each of N scales, to generate N HOFM images. The HOFM image(s) may be stored in memory. In an embodiment, a histogram circuit, such as the histogram circuit 240 illustrated in FIG. 6, computes the HOFM image. Alternatively or additionally, software running on a processor, such as a DSP or a general purpose processor, computes the HOFM image.

In block 170, the system identifies ROIs of the original video image based on the HOFM image. The system differentiates ROIs from regions that are not ROIs using machine learning based on the HOFM image. Examples of machine learning algorithms include a decision tree algorithm, an SVM, or a deep learning algorithm. The machine learning algorithm may build a model supervised, semi-supervised, or unsupervised. The system builds the model based on training data. Then, the system uses the training data to differentiate ROIs from regions that are not ROIs. In one embodiment, the system generates a mask indicating the ROIs. The ROIs and the mask may be stored in memory. The block 170 may be performed in software running on a processor, such as a general purpose processor or a DSP.

In block 174, the system detects and classifies objects in the original video image based on the HOFM image. In an embodiment, the system uses a machine learning algorithm, such as a decision tree algorithm, SVM, or deep learning output, to classify the objects. Machine learning may be unsupervised, semi-supervised, or supervised. The system may classify the objects into categories, such as, e.g., 3D objects, flat features, or no feature. The system may mark an output image identifying image regions containing 3D objects and image regions identifying flat features, such as parking markings, lane markings, or no feature. The block 174 may be run by software running on a processor.

Figure 8:
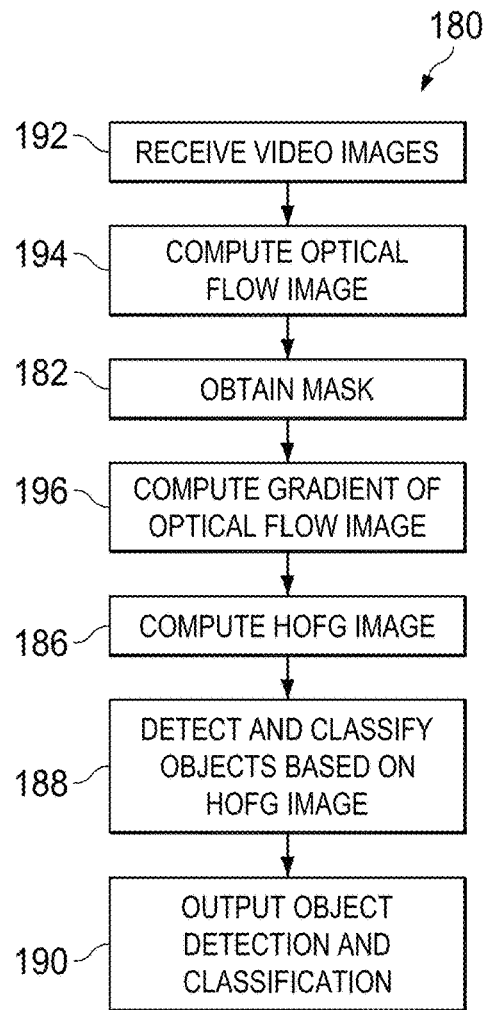
FIG. 8 illustrates a flowchart for an example method for identifying 3D objects.

FIG. 8 illustrates flowchart 180 for an example method of classifying objects based on at least one HOFG image. A system, for example an SoC using hardware and/or software, performs the method illustrated by the flowchart 180. In block 192, the system receives a stream of video images.

In block 194, the system computes the optical flow image for the video images received in the block 192. The system computes gradients in the x and y directions, and in time, $I_x$, $I_y$, and $I_t$. Then, the system computes the optical flow u and v in the x and y direction, where u indicates the optical flow in the x direction and v indicates the optical flow in the y direction. The system computes an optical flow image, where pixels of the optical flow image contain optical flow vector values. The system computes the optical flow vector values by solving for u and v, using:

$$\begin{bmatrix} \sum_w I_x^2 & \sum_w I_x I_y \\ \sum_w I_x I_y & \sum_w I_y^2 \end{bmatrix} \begin{bmatrix} u \\ v \end{bmatrix} = \begin{bmatrix} \sum_w I_x I_t \\ \sum_w I_y I_t \end{bmatrix},$$

where w is the optical flow window, $I_x$ is the gradient in the x direction, $I_y$ is the gradient in the y direction, and $I_t$ is the gradient in time. The block 194 may be performed in software by a processor, such as a general purpose processor or a DSP. In another embodiment, an optical flow digital circuit, such as an off-chip optical flow accelerator or co-processor, performs the block 194.

In block 182, the system obtains masks identifying the ROIs in the optical flow images, computed in the block 194. In an embodiment, system identifies the ROIs by the method illustrated by the flowchart 160 in FIG. 7. The system may retrieve the mask from memory, or it may compute the ROIs.

In block 196, the system computes the gradient of optical flow image, which is an image where the pixel values indicate the value of the gradient of optical flow. The gradient of optical flow is:

$$\tan^{-1}\left(\frac{u}{v}\right),$$

where u and v are the optical flow in the x and y directions, respectively. In one embodiment, the system only computes the gradient of optical flow in the areas indicated by a mask. In another embodiment, the system computes the gradient of optical flow for the entire optical flow image. In an embodiment, a processor, for example by a general purpose processor or a DSP, performs the block 196.

In block 186, the system computes HOFG values for the gradient of optical flow image computed in the block 196. The system increments bin i, j, k, b of the HOFG value for a pixel when the gradient of optical flow value, computed in the block 196, falls within the bin b, for location i, j and scale k. The system computes the HOFG values for overlapping or non-overlapping blocks over multiple scales of blocks, for example N scales. In one embodiment, the system uses the same set of overlapping or non-overlapping blocks and set of scales for computing the HOFM image and the HOFG image. In other examples, the system uses different scales, or different sets of overlapping or non-overlapping blocks, to compute the HOFM image and the HOFG image. In an embodiment, overlapping blocks are used for the HOFG image and non-overlapping blocks are used for the HOFM image. In another embodiment, non-overlapping blocks are used for the HOFG image and overlapping blocks are used for the HOFM image. In an embodiment, the system only uses one set of blocks. In one embodiment, a histogram circuit computes the HOFG image. In another embodiment, software running on a processor, for example a general purpose processor or a DSP, computes the HOFG image. The HOFG image may be stored in memory, for example DDR SDRAM memory.

In block 188, the system detects and classifies objects in the original video image based on the HOFG image using a machine learning algorithm. The system develops a model using a machine learning algorithm, such as a decision tree algorithm, SVM, or a deep learning output. Machine learning may be unsupervised, semi-supervised, or supervised. The system may mark an output image identifying image regions containing 3D objects and image regions identifying flat features, such as parking markings, lane markings, or no feature. The block 188 may be performed in software running on a processor, for example a DSP or a general purpose processor.

In block 190, the system outputs the object detection and classification determined in the block 188. In an embodiment, the system may output the object classification by outputting the image containing markings to a user, for example a driver of the vehicle, to assist in decision making. Additionally or alternatively, the system outputs the identified regions to another ADAS, identifying obstacles for avoidance and flat features. Also, the system may store the object classification in memory for future use.

In an embodiment, the system collects HOFM and HOFG data based on cameras mounted on a vehicle. For example, the system collects data from cameras mounted on four sides of an automobile. The data was collected during the day, using four 1 megapixel (MP) cameras with a 30 frames per second (fps) frame speed and fish eye 180 degree lenses. The HOFM image and the HOFG image may be computed for a variety of circumstances, to successfully differentiate 3D objects from flat features.

Figure 9:
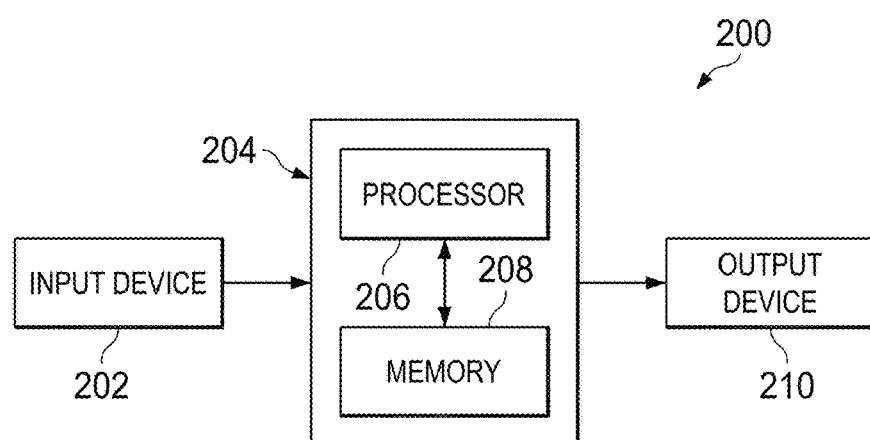
FIG. 9 illustrates an example computing system.

FIG. 9 illustrates a block diagram of example computing system 200. The computing system 200 includes the computing device 204. In at least one example, the computing device 204 is a general purpose computer. In other embodiments, the computing device 204 is a programmed machine that executes a specific task or set of tasks, such as an application specific integrated circuit (ASIC). In another example, the computing device 204 is a microcontroller with embedded instructions. The computing device 204 includes memory 208 for storing data and machine-readable instructions. The computing device 204 also includes processor 206 that accesses a memory 208 and executes the machine-readable instructions. The memory 208 is a non-transitory computer-readable medium. In some examples, the memory 208 is a volatile memory, such as random access memory, non-volatile memory, such as a hard disk drive, a solid state drive, or a flash memory, or a combination thereof.

Additionally, the computing system 200 includes input device 202 and output device 210. The input device 202 may be a video camera, a radar sensor, a touch-screen display, a mouse, a keyboard, or another input device. The output device 210 may be a monitor, a touch-screen display, a printer, or another output device, such as a network interface. The computing device 204 and/or the processor 206 may be configured to perform any combination of some or all of any of the HOFM and HOFG image processing techniques described in this disclosure.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. A method, comprising:
   determining a set of optical flow vectors based on a set of images;
   determining an optical flow image based on the set of optical flow vectors;
   determining a first set of blocks and a second set of blocks associated with the optical flow image, wherein the first set of blocks and the second set of blocks have different block sizes;
   determining a first histogram of gradients of the first set of blocks and a second histogram of gradients of the second set of blocks; and
   detecting an object in the set of images based on the first and second histograms of gradients.

2. The method of claim 1, further comprising:
   determining a third set of blocks and a fourth set of blocks associated with the optical flow image;
   determining a first histogram of magnitudes of the third set of blocks and a second histogram of magnitudes of the fourth set of blocks; and
   detecting the object in the set of images based on the first and second histograms of magnitudes.

3. The method of claim 2, further comprising:
   determining a region of interest (ROI) in the set of images based on the first and second histograms of magnitudes.

4. The method of claim 3, wherein determining a first set of blocks and a second set of blocks comprises determining the first set of blocks and the second set of blocks within the ROI.

5. The method of claim 2, wherein the first set of blocks and the third set of blocks have the same block size, and the second set of blocks and the fourth set of blocks have the same block size.

6. The method of claim 1, wherein detecting an object in the set of images comprises applying a learning algorithm to the first and second histograms of gradients to detect the object in the set of images.

7. The method of claim 6, wherein the learning algorithm is a decision tree algorithm, a support vector machine algorithm, or a deep learning algorithm.

8. The method of claim 1, wherein determining the set of optical flow vectors comprises determining the set of optical flow vectors based on at least one of: a phase correlation algorithm, a sum of squared differences algorithm, a sum of absolute difference algorithm, normalized cross-correlation algorithm, a differential optical flow algorithm, or a discrete optimization optical flow algorithm.

9. The method of claim 1, wherein the first set of blocks overlaps with the second set of blocks.

10. The method of claim 1, wherein the first set of blocks does not overlap with the second set of blocks.

11. A non-transitory computer readable medium storing program instructions that, when executed by one or more processors, cause the one or more processors to:
   determine a set of optical flow vectors based on a set of images;
   determine an optical flow image based on the set of optical flow vectors;

determine a first set of blocks and a second set of blocks associated with the optical flow image, wherein the first set of blocks and the second set of blocks have different block sizes;

determine a first histogram of magnitudes of the first set of blocks and a second histogram of magnitudes of the second set of blocks; and detect an object in the set of images based on the first and second histograms of magnitudes.

12. The non-transitory computer readable medium of claim 11, wherein the program instructions further cause the one or more processors to:

determine a third set of blocks and a fourth set of blocks associated with the optical flow image;

determine a first histogram of gradients of the third set of blocks and a second histogram of gradients of the fourth set of blocks; and detect the object in the set of images based on the first and second histograms of gradients.

13. The non-transitory computer readable medium of claim 12, wherein the program instructions further cause the one or more processors to:

determine a region of interest (ROI) in the set of images based on the first and second histograms of magnitudes.

14. The non-transitory computer readable medium of claim 13, wherein to determine a third set of blocks and a fourth set of blocks, the program instructions cause the one or more processors to determine the third set of blocks and the fourth set of blocks within the ROI.

15. The non-transitory computer readable medium of claim 12, wherein the first set of blocks and the third set of blocks have the same block size, and the second set of blocks and the fourth set of blocks have the same block size.

16. The non-transitory computer readable medium of claim 11, wherein to detect an object in the set of images, the program instructions cause the one or more processors to apply a learning algorithm to the first and second histograms of gradients to detect the object in the set of images.

17. The non-transitory computer readable medium of claim 16, wherein the learning algorithm is a decision tree algorithm, a support vector machine algorithm, or a deep learning algorithm.

18. The non-transitory computer readable medium of claim 11, wherein to determine the set of optical flow vectors, the program instructions cause the one or more processors to determine the set of optical flow vectors based on at least one of: a phase correlation algorithm, a sum of squared differences algorithm, a sum of absolute difference algorithm, normalized cross-correlation algorithm, a differential optical flow algorithm, or a discrete optimization optical flow algorithm.

19. The non-transitory computer readable medium of claim 11, wherein the first set of blocks overlaps with the second set of blocks.

20. The non-transitory computer readable medium of claim 11, wherein the first set of blocks does not overlap with the second set of blocks.

* * * * *